(12) United States Patent
Brown et al.

(10) Patent No.: US 6,831,119 B2
(45) Date of Patent: Dec. 14, 2004

(54) ADDITIVE FOR RUBBER ELASTOMERS

(75) Inventors: Donald Brown, Vermilion, OH (US); Harvey Kaufman, Hudson, OH (US)

(73) Assignee: Don-B Corporation, Vermilion, OH (US)

( * ) Notice: Subject to any disclaimer, the term of this patent is extended or adjusted under 35 U.S.C. 154(b) by 0 days.

(21) Appl. No.: 10/675,453

(22) Filed: Sep. 30, 2003

(65) Prior Publication Data

US 2004/0157963 A1 Aug. 12, 2004

Related U.S. Application Data

(63) Continuation-in-part of application No. 10/359,941, filed on Feb. 6, 2003, now abandoned.

(51) Int. Cl.$^7$ .................................................. C08K 3/34
(52) U.S. Cl. ........................ 524/47; 524/425; 524/442; 524/492; 524/493
(58) Field of Search ........................... 524/47, 425, 442, 524/492

(56) References Cited

U.S. PATENT DOCUMENTS

| | | | |
|---|---|---|---|
| 5,120,785 A | 6/1992 | Walker et al. |
| 5,719,203 A | 2/1998 | Thobor |
| 6,017,980 A | 1/2000 | Wang et al. |
| 6,084,018 A | 7/2000 | Wildburg et al. |
| 6,184,306 B1 | 2/2001 | Materne et al. |

FOREIGN PATENT DOCUMENTS

EP 1 076 061 A1 2/2001

*Primary Examiner*—Edward J. Cain
(74) *Attorney, Agent, or Firm*—Pearne & Gordon LLP

(57) ABSTRACT

An additive/process aid for polymeric materials such as rubber elastomers comprises a mixture of gray slate flour, corn starch, a liquid polyester resin or an epoxy resin, calcium carbonate and silica gel or a fatty acid. The additive/process aid facilitates the processing and enhances the physical properties of the rubber elastomer.

27 Claims, No Drawings

ADDITIVE FOR RUBBER ELASTOMERS

This application is a continuation-in-part of application U.S. Ser. No. 10/359,941, filed Feb. 6, 2003 now abandoned.

BACKGROUND OF THE INVENTION

This invention is directed to an additive/process aid for polymeric materials such as rubber elastomers. More particularly, this invention is directed to an additive/process aid for such polymeric materials to facilitate the processing and/or enhance the properties of the elastomers.

Polymeric materials such as rubber elastomers are used for the manufacture of various products including tire components such as tire tread, wedge compounds, sidewalls, bead filler and tire carcasses. However, it is well known that rubber elastomers tend to exhibit certain undesirable physical characteristics, such as, poor tear strength.

Tear strength or crescent tear is a measurement of the resistance of a material to tear forces. The higher the crescent tear measurement, the more difficult it is for the elastomer to be torn from whatever it is bonded to, such as steel.

Rubber elastomers also tend to exhibit weak tensile strength. Tensile strength is a measurement of the force at which a rubber elastomer can be expected to fail under a tension load. The tensile strength of the rubber elastomer is important in order to maintain its elasticity. Specifically, for rubber elastomers used in tires, the higher the tensile strength, then the more air pressure can be added to the tire, without fear of blowing the tire.

Finally, rubber elastomers tend to have a low elastic limit or tan delta measurement. The tan delta measurement is a measurement of the stress and strain exhibited on the elastomer or the amount of force that can be applied before the elastomer reaches its elastic limit and fails. It is advantageous for numerous applications to increase the elastic limit of rubber.

With particular regard to tire applications, it is desirable to produce rubber elastomers or elastomeric materials capable of exhibiting reduced hysteresis. Such rubber elastomers when fabricated into components for constructing articles such as tires, vibration isolators, power belts, and the like, will display properties of increased rebound, decreased rolling resistance and reduced heat-buildup when subjected to mechanical stress during normal use. Hysteresis refers to the difference between the energy applied to deform an article made from the elastomer and the energy released as the elastomer returns to its initial, un-deformed state. In pneumatic tires for instance, lowered hysteretic properties are associated with reduced rolling resistance and reduced heat build-up during operation of the tire. These properties, in-turn, result in lowered fuel consumption of vehicles using such tires and prolonged tire life. A reduction in the measured tan delta of the elastomer is indicative of a reduction in the hysteresis of the elastomer.

To address these undesirable physical characteristics, process aids and/or additives were introduced into the rubber elastomer composition. Process aids are substances added to aid in the production processing of the rubber elastomers. Additives are substances added to improve specific physical characteristics of the rubber elastomer. Additives can also act as process aids and aid in the processing of the elastomers.

Additives, such as calcium stearate and stearic acid, were used as process aids. However, the organic/organometallic nature of these substances causes them to have limited thermal stability and shelf life. Other prior process aids were products of organic chemical reactions. However, these process aids were not reproducible batch after batch and were often prone to error. Additives, such as carbon blacks and various silicas, were also added to improve, among other things, the tensile strength of rubber elastomers.

Thus, there is a need for a process aid which overcomes the limitations of the prior additives, and is a simple, low-cost product that improves the physical characteristics of rubber elastomers by providing increased tensile strength, elasticity and tear strength.

SUMMARY OF THE INVENTION

In accordance with the present invention, there is provided an additive/process aid for polymeric materials such as rubber elastomers or plastic materials which overcomes the limitations of earlier additives/process aids.

Further, in accordance with the present invention, there is provided an additive/process aid which provides a simple, quick, and low-cost, slow speed mixture blend which produces a stable product. It also improves the physical characteristics of rubber elastomers, by providing, among other things, increased tensile strength, elasticity, and tear strength.

The additive/process aid comprises a mixture of comminuted or micronized shale/slate predominately formed of aluminum, magnesium and/or iron silicates, starch, a reactive resin component, a metal carbonate and an acidic component such as a fatty acid or a silica gel.

As used herein, comminuted shale/slate includes gray slate flour (alumina silicate or ground shale) as well as silicates of aluminum, magnesium and iron and mixtures thereof. The gray slate flour is typically in powder form to assist in its dispersion in the polymeric material.

Starch may be obtained from most agricultural crops; the dominant starch raw materials being potato, cassava, corn and wheat. Corn starch is preferred and the present invention is described with particular reference to the use of the same.

The resin component is selected from the group of reactive polyesters resins and epoxy resins. The reactive cite of the polyester resin may comprise a carbon-carbon unsaturation intermediate ester groups. Preferred polyesters include those used in structural applications such as reinforced laminates. The epoxy resin may comprise a wide range of epoxies as described below, but epoxidized soybean oil is preferred.

The metal carbonate preferably includes a metal selected from Group IA or IIA of the Periodic Table. Calcium carbonate is preferred and described below.

The acidic component may comprise silica gel or a fatty acid. Useful fatty acids include stearic acid and oleic acid.

The additive may be formulated with reduced amounts of metal carbonate and increased amounts of the remaining ingredients varying up to about: 30% flour, 35% starch, 15% resin, 5% metal carbonate and 15% acidic component, by weight, wherein the aggregate amount of the ingredients total 100%. On the other hand, the metal carbonate may be increased and the remaining ingredients reduced to about: 10% flour, 10% starch, 5% resin, 70% metal carbonate and 5% acidic component, by weight, wherein the aggregate amount of the ingredients total 100%. Additive/process aids having these "high" and "low" formulations have provided improvements with acceptable trade-offs in certain of the composition properties readily identified by the skilled compounder.

In preferred compositions, the additive/processing aid comprises from 10 to 30% shale/slate material, 10 to 35% starch, 5 to 15% resin, 10 to 40% metal carbonate, 5 to 15% acidic component, by weight, wherein the aggregate amount of the ingredients total 100%. More preferably, the additive/processing aid comprises from 20 to 30% shale/slate, 20 to 35% starch, 5 to 10% resin, 20 to 35% metal carbonate, 8 to 15% acidic component, by weight, wherein the aggregate amount of the ingredients total 100%.

Preferred additive/processing aid compositions including polyester resin and silica gel comprise from 20 to 29% gray slate flour, 18 to 28% corn starch, 4 to 8% liquid polyester, 10 to 20% calcium carbonate, 8 to 15% silica gel, by weight, wherein the aggregate amount of the ingredients total 100%. More preferably, the additive/processing aid contains about 29% gray slate flour, about 28% corn starch, about 8% liquid polyester, about 20% calcium carbonate, about 15% silica gel, by weight, wherein the aggregate amount of the ingredients total 100%.

Preferred additive/processing aid compositions including epoxy resin and a fatty acid comprise from 20 to 30% gray slate flour, 20 to 35% corn starch, 5 to 10% epoxy, 10 to 20% calcium carbonate, 10 to 15% fatty acid, by weight, wherein the aggregate amount of the ingredients total 100%. More preferably, the additive/processing aid contains about 25% gray slate flour, about 25% corn starch, about 5% epoxy resin, about 35% calcium carbonate, about 10% fatty acid, by weight, wherein the aggregate amount of the ingredients total 100%.

As noted above, the resin may comprise a polyester resin or an epoxy resin. The resins are preferably liquid at rubber processing conditions and have a molecular weight of from about 200 up to about 10,000 or higher.

Suitable epoxy compounds comprise molecules having at least one or more epoxide group per molecule and include epoxidized alkanes, alkenes, cycloalkanes, alkenes an other epoxidized polymers and chemicals. For example, epoxy/ether, epoxy/hydroxyl, epoxy/ester, epoxy/amine ether/amine, and cycloaliphatic ether/hydroxyl group. These compounds contain aliphatic and/or cycloaliphatic groups. Examples include Octyl Epoxy Tallate (Argus Chemical and Union Carbide), Epoxyprene 25 and 50 (Epoxidized Natural Rubber from Guthrie Latex), Epon (Epoxidized Bispheno A from Shell Oil Co.), Styrene Oxide (S500-6 Aldrich Chemical Co.) and 1,2-Epoxy-3-phenoxypropane (24,848-7 Aldrich Chemical Co.). Epoxidized plant (or vegetable) oils, such as epoxidized soybean oil© C P Hall PARAPLEX G62, Argus Chemical, Union Carbide and Harwick Standard) and epoxidized linseed oil (Argus Chemical), are most preferred.

The additive/processing aid is preferably added to polymeric materials such as rubber elastomers or plastic materials such as polyethylene, ethylene propylene. The preferred rubber elastomers are selected from the group consisting of natural rubber, isoprene, chloroprene, halobutyls, SBR rubber, butyl rubber, neoprene, epichlorohydrin rubber, polysulfonated rubber, silicone rubber and mixtures thereof.

These and other aspects of the invention are described below in further detail, the illustrated embodiments being representative of only some of the ways in which the principles and concepts on the invention can be executed and employed.

DETAILED DESCRIPTION OF PREFERRED AND ALTERNATE EMBODIMENTS

The present invention is directed to an additive/process aid to facilitate the production processing of rubber elastomers. Once added to the rubber elastomers, the process aid tends to increase tensile strength, elasticity, and tear strength of these rubber elastomers.

The present invention is both an additive and a process aid. It is an additive because it is part of the final rubber product made by an end user. It is also considered a processing aid because the additive will aid dispersion and give the end user enhanced properties associated with homogeneity as well as more through-put of product in a manufacturing process.

Generally, it is desirable to prepare the additive/processing aid within the preferred ranges of ingredients. Deviations from these ranges may be readily determined by designed compound evaluations measured by the obtained properties. Although deviations from these ranges may occur with trade-off of various properties, the following observations have been made rubber elastomers and additive/process aids including gray slate flour, corn starch, liquid polyester, calcium carbonate and silica gel.

Gray slate flour will typically be used in the range of between 20 and 30%. It is preferable to stay within this range since adding an excessive amount of gray slate flour may cause scorching of the additive/process aid and adding too little gray slate flour causes the additive/process aid to exhibit a low cure state or level of cure. Preferably, about 29 to 30% by weight of gray slate flour is added to the additive/process aid. Gray slate flour helps to aid in the reinforcement of the additive/processing aid. Preferably, the gray slate flour has a particle size in the range of 32 microns. Suitable commercially available sources of gray slate flour include KeyStone Corporation, sold under the name Gray Slate Flour.

Further, the additives/process aid should include about 18 to 30% by weight of corn starch. Again, an excess of corn starch tends to cause scorching of the additive/process aid and a deficiency of corn starch may cause the additive/process aid to exhibit a low degree of cure. Preferably, about 28 to 30% by weight of corn starch is added to the additive/process aid. Corn starch tends to increase the tear strength enhancements of the additive/process aid. Preferably, unhydrolyzed corn starch is added to the additive/process aid. A suitable corn starch is marketed by American Maze Corporation under the designation Unhydrolyzed Corn Starch.

The additive/process aid also comprises at least 4% by weight and up to about 8% by weight of liquid polyester. It is preferred to observe this range since too much polyester tends to inhibit the incorporation of the additive/process aid into the rubber. On the other hand, if too little of the polyester is used, scorching of the product tends to occur. Liquid polyester helps to aid in the reinforcement of the additive/process aid. Preferably, the liquid polyester is clear when added to the additive/process aid. Suitable commercially available sources of liquid polyester include Dynatron Corporation of Atlanta, Ga., the product being sold with the designation Liquid Polyester Resin.

Calcium carbonate should be included in the additive/process aid in accordance with the preferred ranges of from about 10% to about 35% by weight. Permissive ranges of calcium carbonate vary from 5 to 70% by weight as indicated in the "high" and "low" compositions described above. However, excessive amounts of calcium carbonate may tend to cause scorching of the additive/process aid and, too little calcium carbonate, may result in a low degree of cure of the additive/process aid. Preferably, about 20% to about 40% by weight of calcium carbonate is used, and more preferably, from about 32% to about 37% by weight is used.

Calcium carbonate improves the dispersion of the additive/ process aid. Preferably, calcium carbonate is in a white form when added to the additive/process aid. Calcium carbonate is available from the Akrochem Company and from the J. Huber Company, under the name Snowhite Calcium Carbonate.

The silica gel should also be used in the preferred 8 to 15% by weight range. Excess of amounts of silica gel tend to cause scorching on the additive/process aid and, too little silica gel, tends to result in a low degree of cure. Preferably about 15% by weight of silica gel is used. Silica gel may be added in the form of pellets or powder. Silica gel helps to absorb water from the additive/process aid and promotes more uniform dispersion. Preferably, the silica gel is in a white form when added to the additive/process aid. Silica gel may be obtained from U.S. Silica Corporation under the name Minsil Silica Gel.

The additive/process aid of the present invention is prepared as a slow speed, mixer blend. The component of the additive/process aid are added together and mixed, and reacted under suitable time and temperature conditions.

The additive/process aid of the present invention provides many advantages when added to a elastomeric material such as a rubber elastomer, including improved mixing, extrusion and processing characteristics, and improved tear strength. It also maintains shore A hardness and the cure state of the rubber elastomer. Further, it increases tensile strength and elasticity giving the rubber elastomer more flexibility. Finally, it is a simple, low-cost additive/process aid, which consistently produces a stable product.

The additive/process aid is preferably added to rubber elastomers selected from the group consisting of: natural rubber, isoprene, chloroprene, halo-butyls, SBR rubber, butyl rubber, neoprene, epichlorohydrin rubber, polysulfonated rubber, silicone rubber and mixtures thereof. The rubber elastomers find particular utility for tires, tire trends, carcasses and sidewalls, coating stocks, hoses, belting, inner tubes, inner liners, general-purpose rubbers and other uses.

The additive/process aid is preferably added to the rubber elastomer in the range of at least 1 phr and up to 50 phr with consideration of the relative parts of ingredients contained in the additive/process aid itself. Preferably, the additive/ process aid is added to the rubber elastomer in the range of from at least 2 phr and up to 30 phr.

The present invention is further exemplified in the following examples which illustrate the use of the additive/ process aid in a typical rubber compounding recipe. It is understood that the examples are only illustrative of preferred embodiments according to the present invention wherein the claims set forth the scope of the present invention.

EXAMPLE A

The ASTM 297 Test Recipe for Truck Tread Tires was carried out, the resultant rubber elastomer from this test was prepared having the formulation shown in Table I.

TABLE I

RUBBER TEST RECIPE

| Ingredients | Parts per Hundred of Rubber |
|---|---|
| 1. Natural Rubber (RSS or SMR-5) | 53.6 |
| 2. cis-polybutadiene | 13.4 |
| 3. napthenic process oil | 36.0 |

TABLE I-continued

RUBBER TEST RECIPE

| Ingredients | Parts per Hundred of Rubber |
|---|---|
| 4. stearic acid | 2.0 |
| 5. zinc oxide | 5.0 |
| 6. N-660 Black | 10.0 |
| 7. nonox ZA | 2.0 |
| 8. Santocure | 0.8 |
| 9. Sulfur | 2.0 |
| 10. Process Aid of Present Invention | 30.0 |

The Rubber Test Recipe: First, rubber breakdown on a mill is performed. Then, each powder-based ingredients listed in Table I is added to the rubber mill, one at a time, until all are incorporated, including the additive/process aid of the present invention. The additive/process aid of the present invention comprises about 29% by weight of gray slate flour, about 28% my weight corn starch, about 8% by weight of liquid polyester, about 20% by weight of calcium carbonate, and about 15% by weight of silica gel. Then, if there are any oil-based ingredients listed in Table I, these ingredients are mixed in last. Finally, the end product is allowed to mill at least eight minutes.

COMPARATIVE EXAMPLE ONE

A rubber elastomer was prepared having the formulation shown in Table II.

TABLE II

RUBBER TEST RECIPE

| Ingredients | Parts per Hundred of Rubber |
|---|---|
| 1. Natural Rubber (RSS or SMR-5) | 53.6 |
| 2. cis-polybutadiene | 13.4 |
| 3. napthenic process oil | 36.0 |
| 4. stearic acid | 2.0 |
| 5. zinc oxide | 5.0 |
| 6. N-660 Black | 20.0 |
| 7. N-990 Black | 35.0 |
| 8. nonox ZA | 2.0 |
| 9. Santocure | 0.8 |
| 10. Sulfur | 2.0 |

The rubber elastomer composition was again prepared as described above, in Example A.

COMPARATIVE EXAMPLE III

A rubber elastomer was prepared having the formulation shown in Table III.

TABLE III

RUBBER TEST RECIPE

| Ingredients | Parts per Hundred of Rubber |
|---|---|
| 1. Natural Rubber (RSS or SMR-5) | 53.6 |
| 2. cis-polybutadiene | 13.4 |
| 3. napthenic process oil | 36.0 |
| 4. stearic acid | 2.0 |
| 5. zinc oxide | 5.0 |
| 6. N-660 Black | 20.0 |
| 7. nonox ZA | 2.0 |

TABLE III-continued

RUBBER TEST RECIPE

| Ingredients | Parts per Hundred of Rubber |
|---|---|
| 8. Santocure | 0.8 |
| 9. Sulfur | 2.0 |
| 10. Silica 233 | 55.0 |

The rubber elastomer composition was again prepared as described above, in Example A.

Once these three rubber elastomer compositions were prepared, laboratory tests were run, using ASTM 297 test methods on each of the rubber elastomer compositions. The tests were designed to test specific physical characteristics, such as tensile strength, % elongation, and crescent tear of the rubber elastomer compositions. The results of each of the tests performed on each of the Example rubber elastomers are listed in the tables below.

Tensile strength is a measure of the force at which a rubber elastomer can be expected to fail under a tension load. The tensile strength of the rubber elastomer is important in order to maintain its elasticity. It is often desirable that reinforcing agents are added to natural and synthetic rubbers to increase tear strength.

TABLE IV

TENSILE STRENGTH

| Examples | psi |
|---|---|
| 1. Example A | 2750 |
| 2. Comparative Example One | 2500 |
| 3. Comparative Example Two | 2450 |

Percent elongation is a measurement of the stiffness of rubber. The higher the number, the harder the rubber composition to flux. It is often desirable that to add reinforcing agents to natural and synthetic rubbers to increase the percent elongation.

TABLE V

PERCENT ELONGATION

| Examples | percent |
|---|---|
| 1. Example A | 535% |
| 2. Comparative Example One | 500% |
| 3. Comparative Example Two | 489% |

Shore A hardness is a measure on the hardness of rubber. It also provides or indicates the cure state of a rubber composition. It is often desirable to and the reinforcing agents to natural and synthetic rubbers to maintain the Shore A hardness.

TABLE VI

SHORE A HARDNESS

| Examples | Shore A hardness |
|---|---|
| 1. Example A | 61 |
| 2. Comparative Example One | 61 |
| 3. Comparative Example Two | 58 |

Crescent tear or tear strength is the force necessary to propagate a crack or tear under stress on a horizontal pull. It is often desirable to add reinforcing agents to natural and synthetic rubbers to increase tear strength.

TABLE VII

CRESCENT TEAR

| Examples | Lb/inch |
|---|---|
| 1. Example A | 690 |
| 2. Comparative Example One | 650 |
| 3. Comparative Example Two | 632 |

Tan delta is a measure of the rolling resistance. The lower the reading or tan delta value, the lower the rolling resistance. It is often desirable to add reinforcing agents to natural and synthetic rubbers to decrease the tan delta.

TABLE VIII

TAN DELTA

| Examples | resistance |
|---|---|
| 1. Example A | 0.162 |
| 2. Comparative Example One | 0.179 |
| 3. Comparative Example Two | 0.192 |

The results of the rubber elastomer compositions in Comparative Examples One and Two were compared to Example A for changes in the physical properties exhibited by the two rubber elastomer compositions. As apparent from the above data, use of the additive/process aid of the present invention (Example A) resulted in significant increases in tensile strength, percent elongation and crescent tear and reduced tan delta measurements. Moreover, this rubber elastomer composition also maintained its Shore A hardness measurement. Accordingly, the additive/process aid of the present invention imparts favorable properties when utilized in association with rubber elastomers.

Additionally, Example A contains the additive/process aid of the present invention; it does not contain large quanities of other additives/process aids, such as silica or carbon black, as compared to Comparative Examples One and Two. Thus, the improved physical characteristics of the rubber elastomer composition (Example A) are solely attributable to the additive of the present invention.

The additive/process aid including epoxidized oil and fatty acid is illustrated hereinafter. In a preferred formulation, the additive/process aid includes the following ingredients.

ADDITIVE/PROCESS AID COMPOSITION

| Ingredient | DB6 (Wt. %) |
|---|---|
| gray slate flour | 25 |
| corn starch | 25 |
| epoxidized soybean oil | 5 |
| calcium carbonate | 35 |
| stearic acid | 10 |

In accordance with the foregoing additive/process aid formulation, a rubber elastomer composition Example B in accordance with the invention was prepared together with a Comparative Example Three or Control 3 as reported in the following Table IX.

TABLE IX

| MATERIAL | EXAMPLE B PHR | CONTROL 3 PHR |
|---|---|---|
| Natural Rubber (SMR20) | 30.0 | 30.0 |
| SBR 1502 | 70.0 | 70.0 |
| Carbon Black (N339) | 50.0 | 50.0 |
| DB6 | 2.0 | 0.0 |
| Sundex 750 T | 10.0 | 10.0 |
| Antioxidant (Santoflex 134) | 2.0 | 2.0 |
| Stearic Acid | 2.0 | 2.0 |
| Zinc Oxide | 2.5 | 2.5 |
| Akrowax 5030 | 2.0 | 2.0 |
| Sulfur | 2.0 | 2.0 |
| Accelerator CBS[1] | 1.7 | 1.7 |
| Co-accelerator DPG[2] | 0.2 | 0.2 |
| Final Total | 174.4 | 172.4 |

[1] N-Cyclohexyl-benzothiazolesulfenamide
[2] Diphenylguanidine

Mix Cycle: Example B and the Control were mixed in the same manner except for the inclusion of DB6 in Example B. Accordingly, the rubber and carbon black together with DB6 in the case of Example B were mixed for 1.5 minutes t 60 RPM in a mixer preheated to 250° F. Oil followed by Santoflex 134, stearic acid, zinc oxide and Akrowax 5030 were added, and mixing continued to a total mix time of 5.5 minutes. Then, the batches were dumped, formed into sheets on a two roll mill and allowed to cool.

Finish Cycle: The masterbatch followed by CBS, DPG and sulfur are combined in a mixer preheated to 175° F. and mixed at 50 RPM for one minute or temperature increase to 200° F., whichever came first. Each of the rubber elastomers was then provided with 10 roll passes on a 2 roll mill followed by ten cut passes.

TABLE X

| | Example B | Control 3 |
|---|---|---|
| Processability Testing | | |
| Mooney Viscosity ML4@ 212° f. | 54 | 51 |
| Monsanto Rheometer | | |
| Minimum Torque, m-g | 93.1 | 98.7 |
| Maximum Torque, m-g | 11.8 | 11.2 |
| Scorch, t1, min. | 5.67 | 5.67 |
| 90% Cure Time min. | 13.83 | 13.00 |
| Physical Properties | | |
| Stress-Strain Properties | | |
| Room Temperature 23° C. | | |
| 50% Modulus, psi | 285 | 259 |
| 100% Modulus, psi | 573 | 510 |
| 200% Modulus, psi | 1490 | 1351 |
| 300% Modulus, psi | 2539 | 2368 |
| Tensile Strength, psi | 3042 | 2928 |
| Elongation, % | 351 | 357 |
| Elevated Temperature 100° C. | | |
| 50% Modulus, psi | 275 | 244 |
| 100% Modulus, psi | 554 | 484 |
| 200% Modulus, psi | 1301 | 1182 |
| 300% Modulus, psi | — | — |
| Tensile Strength, psi | 1404 | 1449 |
| Elongation, % | 219 | 228 |
| Shore A Hardness | | |
| Room Temperature 23° C. | 70 | 70 |
| Elevated Temperature 100° C. | — | — |
| Tear Strength ASTM D624 Die C | | |
| Room Temperature 23° C. | 193 | 190 |
| Elevated Temperature 100° C. | 102 | 118 |
| Bashore Resilience, % | 41 | 41 |
| | 62 | 60 |
| Dynamic Properties 1 Hz | | |
| 5% Compression | | |
| Elastic Modulus, E' | | |
| 26° C. | $8.05 \times 10^6$ | $7.60 \times 10^6$ |
| 75° C. | $6.63 \times 10^6$ | $6.33 \times 10^6$ |
| 122° C. | $6.05 \times 10^6$ | $5.85 \times 10^6$ |
| Storage Modulus, E" | | |
| 26° C. | $1.80 \times 10^6$ | $1.79 \times 10^6$ |
| 75° C. | $1.08 \times 10^6$ | $1.08 \times 10^6$ |
| 122° C. | $0.812 \times 10^6$ | $0.768 \times 10^6$ |
| Tangent | | |
| 26° C. | 0.223 | 0.235 |
| 75° C. | 0.163 | 0.170 |
| 122° C. | 0.134 | 0.131 |
| 10% Compression | | |
| Elastic Modulus, E' | | |
| 26° C. | $6.81 \times 10^6$ | $6.57 \times 10^6$ |
| 75° C. | $6.04 \times 10^6$ | $5.71 \times 10^6$ |
| 123° C. | $5.77 \times 10^6$ | $5.39 \times 10^6$ |
| Storage Modulus, E" | | |
| 26° C. | $1.39 \times 10^6$ | $1.47 \times 10^6$ |
| 75° C. | $0.876 \times 10^6$ | $0.931 \times 10^6$ |
| 123° C. | $0.687 \times 10^6$ | $0.651 \times 10^6$ |
| Tangent Delta | | |
| 26° C. | 0.204 | 0.223 |
| 75° C. | 0.145 | 0.163 |
| 123° C. | 0.119 | 0.121 |

The use of epoxy resin and fatty acids is further illustrated in the following Examples C and D. More particularly, Examples C and D illustrate variations in the relative amounts or proportions of the ingredients of the additive compositions in accordance with the invention. More particularly, the additive/process aid DB6H of Example C includes a lesser amount of calcium carbonate in favor of relatively high amounts of the remaining ingredients and the aid DB6L used in Example D includes a relatively higher amount of calcium carbonate with reduced amounts of the remaining ingredients as summarized below.

ADDITIVE/PROCESS AID COMPOSITIONS

| Ingredient | DB6H (Wt. %) | DB6L (Wt. %) |
|---|---|---|
| gray slate flour | 30 | 10 |
| corn starch | 35 | 10 |
| epoxidized soybean oil | 15 | 5 |
| calcium carbonate | 5 | 70 |
| stearic acid | 15 | 5 |

Examples C and D in accordance with the invention respectively include additive/process aids DB6H and DB6L together with the additional constituents shown in the following Table IX. For comparison, a Control 4 or Comparative Example Four was prepared as reported in Table XI.

TABLE XI

| MATERIAL | EXAMPLE C PHR | EXAMPLE D PHR | CONTROL 4 PHR |
|---|---|---|---|
| Natural Rubber (SMR20) | 30.0 | 30.0 | 30.0 |
| SBR 1520 | 70.0 | 70.0 | 70.0 |
| Carbon Black (N343) | 41.0 | 41.0 | 41.0 |
| DB6H | 2.0 | 0.0 | 0.0 |
| DB6L | 0.0 | 6.0 | 0.0 |
| Aromatic Oil (Shell 750) | 10.0 | 10.0 | 10.0 |
| Antioxidant (Santoflex 13) | 1.0 | 1.0 | 1.0 |
| Stearic Acid | 2.0 | 2.0 | 2.0 |
| Zinc Oxide | 2.5 | 2.5 | 2.5 |
| Akrowax 5030 | 1.0 | 1.0 | 1.0 |
| Masterbatch Total | 157.5 | 159.5 | 163.5 |
| Masterbatch | 157.5 | 159.5 | 163.5 |
| Sulfur | 1.3 | 1.3 | 1.3 |
| Accelerator CBS[1] | 1.7 | 1.7 | 1.7 |
| Co-accelerator DPG[2] | 0.2 | 0.2 | 0.2 |
| Final Total | 160.7 | 162.7 | 166.7 |

[1]N-Cyclohexyl-benzothiazolesulfenamide
[2]Diphenylguanidine

Masterbatch Mixing procedure: Start temperature 250° F., RPM'S 40, add pre-blended polymers and carbon black (together with DB6H or DB6L in Examples B and C), 0 minutes, mix for 1.5 minutes. Add oil followed by antioxidant, stearic acid, zinc oxide and wax, increase RPM to 60. Mix for 4 minutes and dump. Sheet out and cool.

Final Mixing Procedure: Start temperature 175° F., RPM's 50. Add masterbatch, followed by remaining ingredients. Mix keeping temperature below 200° F. Dropped and performed 10 cut passes and 10 roll passes on mill.

Examples C and D together, with the Control 4 or Comparative Example Four were cured for 15 minutes at 149° C. and tested. The results of the tests are reported below in Table XII.

TABLE XII

| | Example C | Example D | Control 4 |
|---|---|---|---|
| Rheometrics @ 149° C. | | | |
| MH | 72.60 | 75.36 | 73.94 |
| ML | 10.52 | 11.74 | 11.13 |
| TC80 | 14.89 | 13.43 | 13.93 |
| TC90 | 18.13 | 16.75 | 16.77 |
| TS2 | 8.32 | 7.11 | 7.98 |
| TS5 | 9.63 | 8.20 | 9.24 |
| Mooney Viscosity | | | |
| ML (1 + 4) @ 100° C. | 40.31 | 45.19 | 40.30 |
| Shore A Hardness | | | |
| Hardness @ 23° C. | 55.2 | 55.0 | 55.2 |
| Hardness @ 100° C. | 66.2 | 67.4 | 66.0 |
| Pendulum Rebound | | | |
| Rebound @ 23° C. | 52.7 | 56.3 | 53.2 |
| Rebound @ 100° C. | 49.6 | 52.8 | 48.8 |
| Stress-Strain Properties | | | |
| Results at 23 @ ° C. | | | |
| 100% Modulus, psi | 192 | 235 | 183 |
| 200% Modulus, psi | 474 | 618 | 451 |
| 300% Modulus, psi | 1031 | 1314 | 956 |
| Tensile Str., psi | 2814 | 2962 | 2317 |
| Elongation, % | 534 | 496 | 500 |
| Results at 100 @ ° C. | | | |
| 100% Modulus, psi | 176 | 211 | 170 |
| 200% Modulus, psi | 401 | 504 | 385 |
| 300% Modulus, psi | 801 | 984 | 754 |
| Tensile Str., psi | 1225 | 1247 | 1182 |
| Elongation, % | 392 | 351 | 402 |
| Tear Strength | | | |
| Pounds/in. @ 23° C. | 556.9 | 427.4 | 463.4 |
| Pounds/in. @ 100° C. | 310.7 | 241.6 | 336.4 |
| Specific Gravity | 1.0746 | 1.0659 | 1.0686 |
| Tangent Delta[1] | | | |
| Tan Delta @ 5% strain | 0.14305 | 0.13385 | 0.15172 |
| % decrease from Control | 5.714 | 11.778 | na |
| Tan Delta @ 10% strain | 0.13876 | 0.12925 | 0.14654 |
| % decrease from Control | 5.309 | 11.799 | na |

[1](50° C., 1 HZ, Strain Sweep)

As indicated by the foregoing comparisons, the additive/process aid in accordance with the present invention imparts increased tensile strength especially under conditions of elevated temperature and high strain. In addition, hysteresis is reduced as indicated by the decrease in the tan delta values as compared with the Control or Comparative Example Three. Reduced hysteresis is associated with reduced rolling resistance and reduced heat build-up during tire operation or other cycled loading of the rubber elastomer which give rise to lower fuel consumption and/or increased elastomer product life.

Although preferred embodiments have been described in detail, it should be understood that various changes, substitutions, and alterations can be made therein without departing from the spirit and scope of the invention as defined by the appended claims. It will be appreciated that various changes in the details, materials and arrangements of parts, which have been herein described and illustrated in order to explain the nature of the invention, may be made by those skilled in the area within the principle and scope of the invention as will be expressed in the appended claims.

What is claimed:

1. An additive for use in making a rubber elastomer, the additive comprising:

at least 20% by weight and up to about 29% by weight of gray slate flour;

at least 18% by weight and up to about 28% by weight of corn starch;

at least 4% by weight and up to about 8% by weight of liquid polyester;

at least 10% by weight and up to about 20% by weight of calcium carbonate; and at least 8% by weight and up to about 15% by weight of silica gel;

wherein the aggregate amount of the gray slate flour, cornstarch, liquid polyester, calcium carbonate and silica gel totals 100%; and wherein the additive is combined with a rubber elastomer to create a rubber elastomer composition.

2. The additive of claim 1, wherein the additive comprises about 29% by weight of gray slate flour.

3. The additive of claim 2, wherein the additive comprises about 28% by weight of corn starch.

4. The additive of claim 2, wherein the additive comprises about 8% by weight of liquid polyester.

5. The additive of claim 4, wherein the additive comprises about 20% by weight of calcium carbonate.

6. The additive of claim 5, wherein the additive comprises about 15% by weight of silica gel.

7. The additive of claim 6, wherein the silica gel is in the form of pellets.

8. The additive of claim 6, wherein the silica gel is in the form of powder.

9. The additive of claim 1, wherein the rubber elastomer is selected from the group consisting of natural rubber, isoprene, chloroprene, halo-butyls, SBR rubber, butyl rubber, neoprene, epichlorohydrin rubber, polysulfonated rubber, silicone rubber and mixtures thereof.

10. A method of producing an additive for a rubber elastomer, comprising the steps of:
   combining about 29% by weight of gray slate flour, about 28% by weight of corn starch, about 8% by weight of liquid polyester, about 20% by weight of calcium carbonate, and about 15% by weight of silica gel;
   mixing the components together;
   allowing the components to react to form an additive that increases the tensile strength, and crescent tear of rubber elastomers; and
   adding the additive to a rubber elastomer.

11. The method of claim 10, wherein the rubber elastomer is selected from the group consisting of natural rubber, isoprene, chloroprene, halo-butyls, SBR rubber, butyl rubber, neoprene, epichlorohydrin rubber, polysulfonated rubber, silicone rubber and mixtures thereof.

12. A rubber elastomer composition comprised of:
   an additive, wherein the additive comprises;
   about 29% by weight of gray slate flour, about 28% by weight of cornstarch, about 8% by weight of liquid polyester, about 20% by weight of calcium carbonate, and amount 15% by weight of silica gel; and
   a rubber elastomer, wherein the rubber elastomer is selected from the group consisting of natural rubber, isoprene, chloroprene, halo-butyls, SBR rubber, butyl rubber, neoprene, epichlorohydrin rubber, polysulfonated rubber, silicone rubber and mixtures thereof.

13. An additive for use in making a rubber elastomer, the additive comprising:
   from about 10 to about 30% by weight gray slate flour;
   from about 10 to about 35% by weight corn starch;
   from about 5 to about 15% by weight epoxidized soybean oil;
   from about 10 to about 40% by weight calcium carbonate; and
   from about 5 to about 15% by weight of a fatty acid selected from the group consisting of stearic acid and oleic acid;
   wherein the aggregate amount of the gray slate flour, corn starch, epoxidized soybean oil, calcium carbonate and fatty acid totals 100%; and
   wherein the additive is combined with a rubber elastomer to create a rubber elastomer composition.

14. The additive of claim 13, wherein the additive comprises about 25% by weight of gray slate flour.

15. The additive of claim 14, wherein the additive comprises about 25% by weight of corn starch.

16. The additive of claim 15, wherein the additive comprises about 5% of epoxidized soybean oil.

17. The additive of claim 13, wherein the additive comprises:
   from about 20 to about 30% by weight gray slate flour;
   from about 20 to about 30% by weight corn starch;
   from about 5 to about 10% by weight epoxidized soybean oil;
   from about 20 to about 37% by weight calcium carbonate; and
   from about 8 to about 15% by weight of a fatty acid selected from the group consisting of stearic acid and oleic acid;
   wherein the aggregate amount of the gray slate flour, corn starch, epoxidized soybean oil, calcium carbonate and fatty acid totals 100%; and
   wherein the additive is combined with a rubber elastomer to create a rubber elastomer composition.

18. The additive of claim 13, wherein the additive comprises:
   about 25% by weight gray slate flour;
   about 25% by weight corn starch;
   about 5% by weight epoxidized soybean oil;
   about 35% by weight calcium carbonate; and
   about 10% by weight of a fatty acid selected from the group consisting of stearic acid and oleic acid;
   wherein the aggregate amount of the gray slate flour, corn starch, epoxidized soybean oil, calcium carbonate and fatty acid totals 100%; and
   wherein the additive is combined with a rubber elastomer to create a rubber elastomer composition.

19. The additive of claim 13, wherein the rubber elastomer is selected from the group consisting of natural rubber, isoprene, chloroprene, halo-butyls, SBR rubber, butyl rubber, neoprene, epichlorohydrin rubber, polysulfonated rubber, silicone rubber and mixtures thereof.

20. A method of producing an additive for a rubber elastomer, comprising the steps of:
   combining from about 10 to 30% gray slate flour, from about 10 to about 35% corn starch, from 5 to about 15% epoxidized soybean oil, from about 10 to about 40% calcium carbonate and from about 5 to about 15% of a fatty acid selected from the group consisting of stearic acid and oleic acid;
   mixing the components together;
   allowing the components to react to form an additive; and
   adding the additive to a rubber elastomer.

21. The method of claim 20, wherein said elastomer is selected from the group consisting of natural rubber, isoprene, chloroprene, halo-butyls, SBR rubber, butyl rubber, neoprene, epichlorohydrin rubber, polysulfonated rubber, silicone rubber and mixtures thereof.

22. A rubber elastomer composition comprised of:
   an additive, wherein the additive comprises:
   gray slate flour, corn starch, epoxidized soybean oil, calcium carbonate, and a fatty acid selected from the group consisting of stearic acid and oleic acid; and
   a rubber elastomer selected from the group consisting of natural rubber, isoprene, chloroprene, halo-butyls, SBR rubber, butyl rubber, neoprene, epichlorohydrin rubber, polysulfonated rubber, silicone rubber and mixtures thereof.

23. The composition of claim 22, wherein said additive comprises from about 10 to 30% gray slate flour, from about 10 to about 35% corn starch, from 5 to about 15% epoxidized soybean oil, from about 10 to about 40% calcium carbonate and from about 5 to about 15% of fatty acid selected from the group consisting of stearic acid and oleic acid.

24. An additive for use in making a rubber elastomer, the additive comprising:
   from about 10 to about 30% by weight of a comminuted shale/slate predominately formed of aluminum, magnesium and/or iron silicates;
   from about 10 to about 35% starch;
   from about 5 to about 15% of a reactive resin;
   from about 10 to about 40% of a metal carbonate;
   from about 5 to about 15% of an acidic component selected from the group consisting of silica gel and fatty acids;
   wherein the aggregate amount of the comminuted shale/slate, starch, reactive resin, metal carbonate and acidic component totals 100%; and
   wherein the additive is combined with a rubber elastomer to create a rubber elastomer composition.

25. The composition of claim 24, wherein said resin is liquid polyester resin.

26. The composition of claim 24, wherein said resin is selected from the group consisting of octyl epoxy tallate, epoxidized natural rubber, epoxidized Bisphenol A, styrene oxide, 1,2-epoxy-3-phenoxypropane, epoxidized soybean oil and epoxidized linseed oil.

27. A method of producing an additive for a polymeric material comprising the steps of:
   combining from about 10 to 30% gray slate flour, from about 10 to about 35% corn starch, from 5 to about 15% epoxidized soybean oil, from about 10 to about 40% calcium carbonate and from about 5 to about 15% of a fatty acid selected from the group consisting of stearic acid and oleic acid;
   mixing the components together;
   allowing the components to react to form an additive; and
   adding the additive to a polymeric material.

* * * * *

UNITED STATES PATENT AND TRADEMARK OFFICE
CERTIFICATE OF CORRECTION

PATENT NO. : 6,831,119 B2
DATED : December 14, 2004
INVENTOR(S) : Donald Brown et al.

It is certified that error appears in the above-identified patent and that said Letters Patent is hereby corrected as shown below:

Column 3,
Line 47, delete the copyright symbol

Column 5,
Line 19, delete "component" and insert -- components --.

Column 9,
Line 24, delete "minutes t" and insert -- minutes at --.
Line 39, before Table X, the following should be inserted:
    -- The compositions of Example B and Comparative Example Three were tested and the results are reported below in Table X. --

Signed and Sealed this

Third Day of May, 2005

JON W. DUDAS
*Director of the United States Patent and Trademark Office*